United States Patent [19]

Nezu

[11] Patent Number: 5,181,442
[45] Date of Patent: Jan. 26, 1993

[54] DEVICE FOR MACHINING A NON-CIRCULAR SECTIONED WORKPIECE

[75] Inventor: Masahiro Nezu, Kamakura, Japan

[73] Assignee: Kabushiki Kaisha Shoun Kosakusho, Toyonaka, Japan

[21] Appl. No.: 545,393

[22] Filed: Jun. 28, 1990

[51] Int. Cl.$^5$ .......................... B23B 5/24; B23B 21/00
[52] U.S. Cl. .......................... 82/19; 82/118; 82/137
[58] Field of Search ................ 82/19, 59, 60, 61, 62, 82/70.1, 101, 118, 137

[56] References Cited

U.S. PATENT DOCUMENTS

| | | | |
|---|---|---|---|
| 3,813,969 | 6/1974 | Wheeler | 82/19 |
| 3,978,745 | 9/1976 | Okamoto | 82/19 |
| 4,584,915 | 4/1986 | Ichiyanagi et al. | 82/19 |
| 4,646,596 | 3/1987 | Edwards et al. | 82/19 |
| 4,939,963 | 7/1990 | Leiber | 82/19 |

*Primary Examiner*—William E. Terrell
*Attorney, Agent, or Firm*—Morrison Law Firm

[57] ABSTRACT

A machine tool employs a cam, driven in response to an angular position signal of a workpiece, to cyclically displace a cutting tool with respect to the workpiece.

2 Claims, 1 Drawing Sheet

DEVICE FOR MACHINING A NON-CIRCULAR SECTIONED WORKPIECE

BACKGROUND OF THE INVENTION

The present invention relates to machine tools and, more particularly to a high speed device for automatically machining a non-circular workpiece to a predetermined form. Still more particularly, the present invention relates to a high speed device for machining a non-circular workpiece that is controlled by a numerical controller or computer.

One type of conventional device for machining a non-circular workpiece generally requires a model of the required type and profile of the workpiece to be prepared to be installed in the device for replication in the machine tool. This method, commonly called the pantograph method, requires that a precise model of the workpiece be made for each new required shape. In addition, because the models are closely traced by a stylus during the machining process, they are subject to wear and must be replaced periodically. The constant modelling and replacement of the model required in this type of machine therefor requires considerable time and labor.

Inaccuracies inherent in the use of models to control the machining of the workpiece due to delays in positioning the cutting tool also require extensive and labor consuming rework of the machined workpiece.

A second type of device for machining non-circular workpieces employs lead screws that are controlled by a numerical controllers. This type of device is also subject to inaccuracies because the lead screws for positioning the cutting tool against the workpiece are subject to small amounts of end play. Such end play result in machining errors as the lead screws change rotational direction to move the cutting tool in and out. Such errors may be corrected later, or may result in scrap. Labor for correction and wasted scrap increase costs.

OBJECTS AND SUMMARY OF THE INVENTION

Accordingly, it is an object of the invention to provide a device for machining a non-circular sectioned workpiece which overcomes the draw backs of the prior art.

It is a further object of the invention to eliminate the need for the preparation of expensive models for controlling the shape of the workpiece.

It is a still further object of the invention to eliminate the error inherent in the use of lead screws to position the cutting tool against the workpiece.

The present invention uses an eccentric cam that is controlled by a numerical controller to replace the X-axis lead screw for positioning the cutting tool against the work piece. This eliminates the shortcomings of both conventional means. The improvement is due to the near linearity of the eccentric cam drive and to its rapid response. An eccentric cam drive may also replace ball screw drives, which are subject to excessive wear.

Briefly stated, the present invention provides a machine tool employing a cam, driven in response to an angular position signal of a workpiece, to cyclically displace a cutting tool with respect to the workpiece.

According to an embodiment of the invention, there is provided a machine tool comprising: means for rotating a workpiece about a first axis, means for producing an angular position signal responsive to an angular position of the workpiece, a cam, means, responsive to a position of the cam, for displacing the cutting tool along a second axis generally at right angles to the first axis, and means for moving the cam in response to the angular position signal.

According to a feature of the invention, there is provided a machine tool comprising: means for rotating a workpiece about a first axis, an encoder connected to produce an angular position signal responsive to an angular position of the workpiece, a cam, a servo motor effective for bi-directional rotation of the cam, a cutting tool, means for permitting displacement of the cutting tool along a second axis at right angles to the first axis, a cam follower connected to the cutting tool, means for maintaining contact of the cam follower with a surface of the cam, the contact being effective for urging the cutting tool along the second axis, a numerical controller, and the numerical controller producing a drive signal for the servo motor in response to the angular position signal, whereby the cutting tool is cyclically displaced along the second axis in synchronism with rotation of the workpiece.

The above and other objects features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
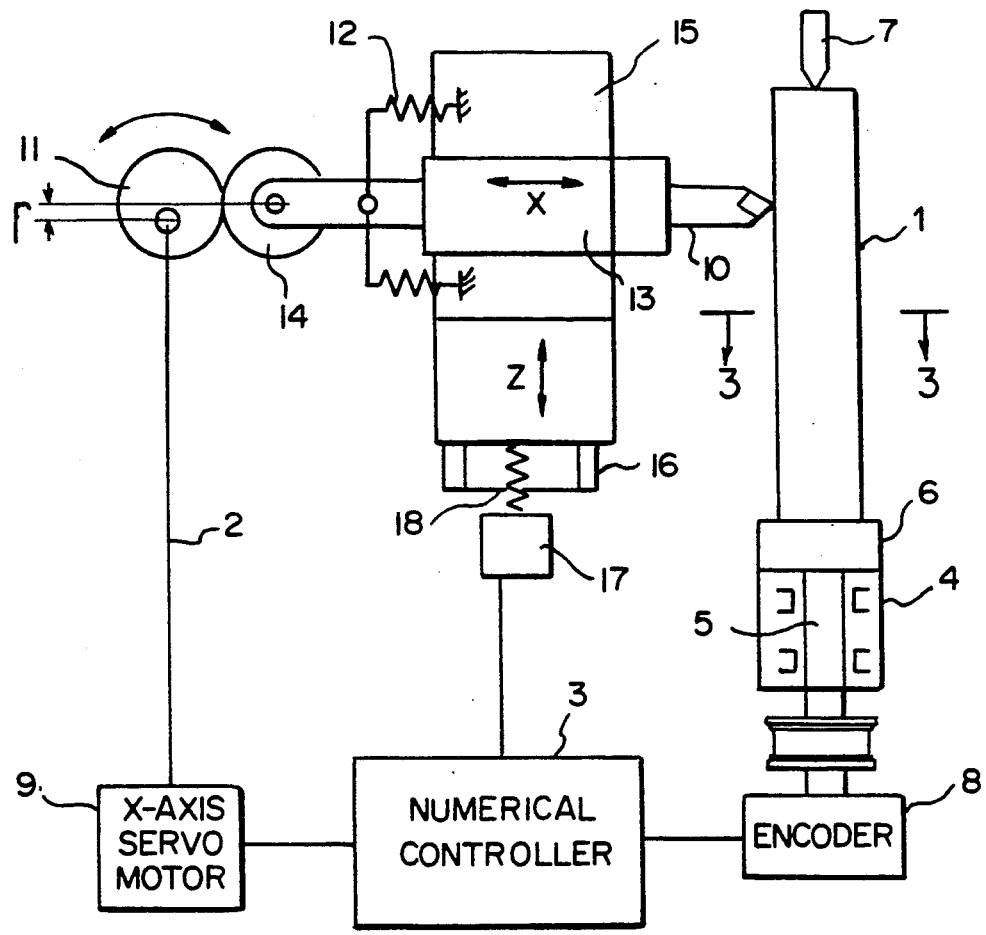
FIG. 1 is a functional diagram of an apparatus according to an embodiment of this invention.

Referring to FIG. 1, a main shaft 5 of a lathe is rotatably supported by head stock 4. Main shaft 5 may be rotated by any suitable conventional driving means (not shown), such as an electrically powered motor or the like. A chuck 6 is disposed on a first end of main shaft 5 for holding a first end of a workpiece 1. Chuck 6 rotates with main shaft 5 to rotate workpiece 1. The second end of workpiece 1 is rotatably supported by lathe center 7.

An encoder 8 is connected on the axis at a second side of main shaft 5. Encoder 8 continually monitors the rotational position of main shaft 5 and therefor of workpiece 1 to generate an output signal that represents the rotational position of workpiece 1.

An electrically encoded output of encoder 8, is connected to a programmable numerical controller 3. Numerical controller 3 develops X- and Z-axis control drive signals from the output of encoder 8. The X- and Z-axis control drive signals are connected to an X-axis servo motor 9 and a Z-axis servo motor 17, respectively.

The output shaft of Z-axis servo motor 17 rotates a lead screw 18 under control of numerical controller 3. A second end of lead screw 18 is rotatably threaded into a saddle 15. Saddle 15 is slidably mounted on a base 16 so that it can slide lengthwise (along the Z axis) with respect to workpiece 1. Saddle 15 is moved along the Z axis of workpiece 1 by the rotation of lead screw 18.

A slide 13 is disposed in saddle 15 for movement along an X axis at right angles to the Z axis, as defined by the direction of movement of saddle 15. A cutting tool 10, for machining workpiece 1, is clamped by conventional means to an end of slide 15 adjacent to workpiece 1.

A cam follower 14 is attached to the opposite end of slide 13. Cam follower 14 is maintained in constant contact with an eccentric cam 11 by springs 12. Cam follower 14 may be a non-rotating contact element but, in the preferred embodiment, it is in the shape of a wheel to reduce wear.

Eccentric cam 11 is attached to the end of rotatable cam shaft 2, which is drivable both clockwise and counterclockwise by the output shaft of X-axis servo motor 9 under the control of numerical controller 3. The rotational position of cam shaft 11 determines the radial position of cutting tool 10 with respect to workpiece 1 by pressing against cam follower 14 and, thereby, pressing cutting tool 10 mounted on slide 15, against workpiece 1. The depth of the cut made by cutting tool 10 in workpiece 1 is determined by the rotational position of eccentric cam 11.

Figure 2:
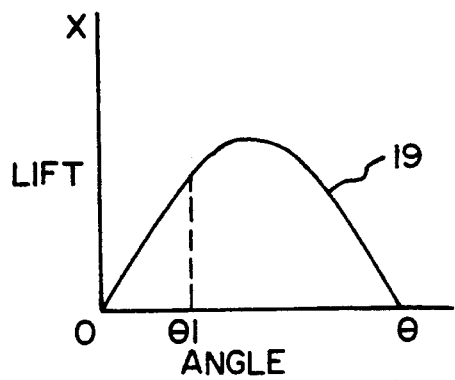
FIG. 2 is a curve showing the relationship of the rotation angle of a cam shaft to the lift of the cam follower contacting an eccentric cam.

FIG. 2 is a curve 19 showing the displacement of cutting tool 10 along the X axis as the rotational angle of eccentric cam 11 is varied. The horizontal axis represents 360 degrees of rotation of eccentric cam 11. The vertical axis represents the forward displacement of cutting tool 10 caused by eccentric cam 11 at each angle of rotation. Curve 19 therefore represents the displacement of cutting tool 10 through 360 degrees of rotation of eccentric cam 11.

As can be seen in curve 19 of FIG. 2, the displacement of cutting tool 10 produced by 360 degree of rotation of eccentric cam 11 is equal to 180 degrees of a sine wave (zero-theta). This indicates that the X-axis displacement of cutting tool 10 would not be linear through the central portion of the curve. For that reason, the clockwise and counterclockwise rotation of eccentric cam 11 is limited between angles zero and theta 1. Over this range the X-axis displacement of cutting tool 10 by eccentric cam 11 is substantially linear.

Referring again to FIG. 1, during operation, as workpiece 1 on main shaft 5 is rotated from a zero degree starting point, encoder 8 continually monitors the rotational position of workpiece 1 and reports the angular data in the form of a coded electrical signal to numerical controller 3. In response to the received angular data, numerical controller 3 determines the X-axis displacement required at each position to achieve the programmed shape in the finished workpiece 1. Suitable control signals are connected to X-axis servo motor 9 to rotate cam shaft 2 and eccentric cam 11, thereby displacing cutting tool 10 the required distance along the X axis.

Figure 3:
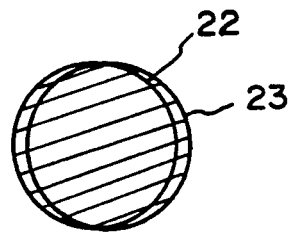
FIG. 3 is a cross section of typical non-circular workpieces taken along III—III in FIG. 1.

To achieve an elliptical cross section in workpiece 1, such as cross section 22 or 23 shown in FIG. 3, the rotation angle of eccentric cam 11 is set initially to a value giving minimum displacement of cutting tool 10. As workpiece 1 is rotated, numerical controller 3 receives rotational position data from encoder 8 and generates the required control signal to cause X-axis servo motor 9 to rotate cam shaft 2 and eccentric cam 11 clockwise, thus displacing cam follower 14, slide 13 and cutting tool 10 along the X axis toward workpiece 1. When workpiece 1 reaches 90 degrees of rotation from its zero reference angle, eccentric cam 11 is reversed.

At 180 degrees of rotation of workpiece 1, eccentric cam is again reversed to move cutting tool 10 toward workpiece 1. This process is repeated in the angular range from 180 to 360 degrees. The amount of displacement of cutting tool 10 is relatively small for a near-circular ellipse such as in cross section 22 of FIG. 3, and is greater for an ellipse such as in cross section 23.

While the workpiece is being rotated, a Z-axis drive signal from numerical controller 3 causes Z-axis servo motor 17 to rotate lead screw 18 in the direction necessary to displace saddle 15 and cutting tool 10 along the length of the workpiece at a controlled rate as the cutting cycle previously described is repeated. In this manner the elliptical cross section of workpiece 1 is produced along its entire length.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A machine tool comprising:
   a cutting tool;
   means for rotating a workpiece about a first axis;
   means for producing an angular position signal responsive to an angular position of said workpiece about said first axis;
   said means for producing an angular position signal being an encoder coupled to said workpiece;
   a cam follower;
   a cam;
   spring means urging said cam follower against said cam;
   means, responsive to a position of said cam, for displacing said cutting tool along a linear second axis generally at right angles to said first axis;
   said means for displacing said cutting tool including a saddle displaceable along said first axis and a slide displaceably carried by said saddle for linear motion along said linear second axis;
   said cutting tool being removably carried at a first end of said slide and said cam follower being carried on a second end thereof;
   said cam follower including a rotatably mounted wheel;
   said cam including an eccentrically mounted disk;
   a servo motor for bidirectionally rotating said cam; and
   a numerical controller which actuates said servo motor responsive to said angular position signal to rotate said cam in both rotational directions during each revolution of said workpiece within an angular range limited such that the displacement of said cutting tool along said second axis is a substantially linear function of the rotation angle of said cam.

2. A machine tool comprising:
   means for rotating a workpiece about a first axis an encoder, connected to produce an angular position signal responsive to an angular position of said workpiece about said first axis;
   a cam;
   a servo motor effective for bi-directional rotation of said cam;
   a cutting tool;
   means for displacing said cutting tool along a linear second axis at right angles to said first axis;

a cam follower;

said means for displacing said cutting tool including a saddle displaceable along said first axis and a slide displaceably carried by said saddle for motion along said linear second axis;

said cutting tool being removably carried at first end of said slide and said cam follower being carried on a second end thereof;

means for maintaining contact of said cam follower with a surface of said cam;

said contact being effective for urging said cutting tool along said linear second axis;

said cam including an eccentrically mounted disk; and a numerical controller which actuates said servo motor responsive to said position signal to rotate said cam in each rotational direction so that its rotational direction reverses substantially each quarter revolution of said workpiece.

* * * * *